United States Patent

Foss

[15] 3,649,322
[45] Mar. 14, 1972

[54] TITANIUM DIOXIDE PIGMENT COMPOSITION AND A METHOD FOR MAKING THE SAME

[72] Inventor: Warren M. Foss, 227 Woodbridge Ave., Metuchen, N.J. 08840

[22] Filed: Apr. 20, 1970

[21] Appl. No.: 30,219

Related U.S. Application Data

[63] Continuation-in-part of Ser. No. 839,088, July 3, 1969.

[52] U.S. Cl................................................106/300, 106/308
[51] Int. Cl.......................................................C09c 1/36
[58] Field of Search..........................................106/300, 308 B

[56] References Cited

UNITED STATES PATENTS

| | | | |
|---|---|---|---|
| 3,035,966 | 5/1962 | Siuta | 106/300 X |
| 3,383,231 | 5/1968 | Allan | 106/300 |
| 3,437,502 | 4/1969 | Werner | 106/300 |
| 3,497,373 | 2/1970 | Rieck et al. | 106/300 X |
| 3,510,334 | 5/1970 | Goodspeed | 106/300 |
| 3,515,566 | 6/1970 | Moody et al. | 106/300 |

*Primary Examiner*—Tobias E. Levow
*Assistant Examiner*—H. M. S. Sneed
*Attorney*—Charles F. Kaegebehn, Robert L. Lehman, Harold L. Gammons and Robert L. Holiday

[57] ABSTRACT

An aluminum silicate encapsulated pigmentary titanium dioxide combining both high tinting strength and durability in coating compositions and in particular thermosetting and thermoplastic acrylic coating compositions is prepared by coprecipitating hydrous silicon oxide with hydrous aluminum oxide onto titanium dioxide in aqueous slurry in a manner to form a dense skin coating of aluminum silicate, optionally applying a sponge coating of aluminum oxide and thereafter finishing the silicate coated pigment by washing, drying and milling.

13 Claims, No Drawings

TITANIUM DIOXIDE PIGMENT COMPOSITION AND A METHOD FOR MAKING THE SAME

This application is a continuation-in-part of my application Ser. No. 839,088 filed July 3, 1969 now abandoned.

BACKGROUND OF THE INVENTION

Among the well-known uses of $TiO_2$ pigments is its use in coating compositions as, for example, in linseed oil base paints and in resinous systems such as paints having an alkyd resin base. These prior art pigments have been designed to impart high opacity, good gloss, high chalk resistance and other desirable properties to the aforesaid paint systems for the particular purpose desired. However, industry is now showing considerable interest in the more durable acrylic resin systems but it was found, at the outset, that $TiO_2$ pigments which are acceptable in linseed oil or alkyd systems were unsatisfactory in acrylic systems.

SUMMARY OF THE INVENTION

In its broadest aspects the invention relates to pigmentary $TiO_2$ encapsulated with an impervious dense skin of a hydrated aluminum silicate with or without a coating of sponge alumina the amount of hydrated aluminum silicate on the $TiO_2$ pigment being from 5 to 20 percent on a $TiO_2$ weight basis and the amount of sponge alumina being from 1.0 to 2.0 percent.

While an exact explanation for the superior results achieved in acrylic systems by the silicate encapsulated $TiO_2$ pigment of this invention is not known, it is postulated that the nature of acrylic resins, as distinguished from linseed oil or alkyd systems, is such that it is imperative that the pigment be completely shielded from contact with the acrylic resin; and that the coating used to shield the $TiO_2$ be one which is substantially impervious. Heretofore, it has been assumed that when a $TiO_2$ pigment is treated with hydrous oxides i.e., titania, alumina, silica or the like, using the techniques of the prior art, the hydrous oxide(s) provided a uniform coating over the entire surface of the pigment. It has now been shown by electron photomicrographs that this is not generally so but that the coatings are discontinuous and/or porous and, as a consequence, relatively large areas of the pigment are exposed.

Pursuant to the objects of the invention, it was discovered that when the hydrous oxides of aluminum and silicon are coprecipitated onto pigmentary $TiO_2$ in the manner hereafter described, a dense skin of hydrated aluminum silicate is formed which completely encapsulates the $TiO_2$ pigment particles and, as a consequence, the treated pigment is characterized by excellent durability in acrylic resin coating compositions. The dense skin coating of aluminum silicate may be applied in a single stage in which case a final source coating of aluminum oxide is necessary to insure a pigment having both good durability plus good tinting strength; or optionally the skin coating of aluminum silicate may be applied in two or more successive stages preferably with drying and milling following each successive stage, in which case the final pigment will combine excellent tinting strength with excellent durability. The invention also embraces the addition of a final sponge coating of aluminum oxide to multiple skin coatings of aluminum silicate to form a pigment which combines maximum tinting strength with maximum durability in acrylic systems.

As will be apparent from the description which follows, the term "encapsulated" as used herein and in the claims is definitive of a continuous unbroken coating completely enclosing the $TiO_2$ pigment, while the term "dense" as applied to the coating is indicative of its imperviousness. Also, inasmuch as the amount of silicate used to encapsulate the $TiO_2$ pigment is relatively small, the coating is relatively thin and by the nature of its application adheres tightly to the pigment and hence may be further identified as a skin coating. In contradistinction the term "sponge," as used hereinafter to describe the coating of hydrous aluminum oxide, is indicative of the relatively fluffy, pervious hydrous oxide coatings heretofore commonly used in the art.

The process of this invention may be described briefly as comprising encapsulating pigmentary $TiO_2$ in a dense skin of hydrated aluminum silicate in one or two stages in which $SiO_2$ and $Al_2O_3$ are coprecipitated onto the pigmentary $TiO_2$ by forming an aqueous slurry of pigmentary $TiO_2$, heating the slurry to a temperature of at least 70° C., adjusting the pH to within the range of 8.5 to 10.5, then simultaneously and slowly adding solutions of soluble salts of silicon and aluminum to form an aluminum silicate coating while maintaining the pH of the slurry from 8.5 to 10.5 and at a temperature of at least 70° C. Whether applying a single skin coating of aluminum silicate or multiple skin coatings each coating of hydrous aluminum silicate precipitated on the $TiO_2$ in aqueous slurry is allowed to age for a predetermined length of time.

The silicate encapsulated $TiO_2$ may be finished in any one of several ways depending upon the number of silicate coatings applied. Thus when a single skin coating of aluminum silicate is applied to the pigment the latter will be finished by applying a sponge coating of alumina followed by drying at a temperature from 120° C. to 250° C. and milling, preferably at a steam to pigment ratio of from 3:1 to 5:1. However when multiple skin coatings of aluminum silicate are applied to the pigment it is preferred, though not essential, to finish the pigment, following one or more skin coatings by drying the pigment at from 120° C. to 350° C. and then milling by steam micronizing at a steam to pigment ratio of from 3:1 to 5:1. Moreover for maximum tinting strength and durability the multicoated pigment may be given a final sponge coating of alumina followed by drying at 120° C. and milling.

Although the silicate encapsulated $TiO_2$ pigment of the instant invention exhibits acceptable properties when used in oil or alkyd resin systems, it has been found that when used in acrylic systems it combines both high hiding power with high durability and/or resistance to chalking.

DESCRIPTION OF THE PREFERRED EMBODIMENT

The starting material for the preparation of the pigment of the instant invention is a finely divided $TiO_2$ pigment which may be raw or unprocessed $TiO_2$ produced by the vapor phase reaction of $TiCl_4$ with oxygen; or a raw vapor phase $TiO_2$ which has been calcined to remove the chloride values. Also, the pigment may be a calcined $TiO_2$ prepared from hydrolysis of a titanium sulfate-ferrous sulfate solution. In any case, however, it is necessary to employ a $TiO_2$ possessing good color, i.e., high lightness and tone as measured by the green, red and X-blue reflectance values on a Colormaster Differential Colorimeter.

The $TiO_2$ pigment is slurried in water at 15-30 percent solids, heated to a temperature from at least 70° C. to boiling and the pH of the slurry adjusted to between 8.5 and 10.5 by adding an alkalizing agent, such as $NH_4OH$ or $NaOH$. While the slurry is held within this alkaline pH range, salt solutions of silicon and aluminum are added simultaneously and slowly, i.e., at a rate not to exceed 10 percent total silicate coating per hour, to coprecipitate $Al_2O_3$ and $SiO_2$ onto the surface of the pigment particles as a dense, silicate skin of hydrated aluminum silicate. The dense silicate skin is then aged by maintaining the pH of the slurry at 7.0-10.5 while holding the slurry at a temperature of at least 70° C. to boiling for at least 45 minutes to 90 minutes. When two or more skin coatings of aluminum silicate are to be applied then the pH of the aged slurry is readjusted, if necessary, to 8.5-10.5 prior to applying the next coating by adding an alkalizing agent whereupon another dense skin coating of hydrated aluminum silicate is precipitated in the same manner as the preceeding silicate coating, each succeeding skin coating of aluminum silicate being aged by holding the pH of the slurry at 7.0–10.5 and at a temperature of at least 70° C. to boiling for at least 45 minutes to 90 minutes. Following application of the final skin coating of aluminum silicate the slurry is filtered and the silicate encapsulated $TiO_2$ washed, dried by heating to an elevated temperature, in accordance with the conditions stipulated above, followed by micronizing at a steam to pigment ratio of from 3:1 to 5:1.

As stated above, the $SiO_2$ and $Al_2O_3$ are coprecipitated by simultaneously adding solutions of soluble salts of aluminum and silicon to the slurry and it is essential to the formation of the dense skin coating of hydrated aluminum silicate that the pH of the slurry be maintained within the limits of 8.5 to 10.5. If one of the soluble salts is acidic, then an alkalizing agent is also added to maintain the alkaline pH. Moreover, despite the precipitation of the dense skin of hydrated aluminum silicate in one or two stages with ageing between stages, the final skin coating has been found to be a homogeneous, impervious, hydrated aluminum silicate which completely encapsulates the pigmentary $TiO_2$.

To be most effective in acrylic systems, the amount of dense hydrated aluminum silicate coating on the $TiO_2$ pigment particles should be from 5 percent to 20 percent based on the weight of the $TiO_2$. Moreover, the ratio of $SiO_2$ to $Al_2O_3$ may range from 2:1 to as high as 8:1 but is preferably about 4:1. Further, it is not necessary that equal amounts of silica and alumina be coprecipitated at each stage and equally effective results have been achieved by coprecipitating from ¼ to ¾ of the total amount of $SiO_2$ and $Al_2O_3$ in the first stage, and the remaining portion in the second stage.

As mentioned at the outset, while a pigmentary $TiO_2$ encapsulated with a dense impervious skin of hydrated aluminum silicate according to the multistage coating process outlined above has outstanding optical properties plus durability when employed in acrylic resin systems, it has been found that when the silicate skin coating is formed by the use of relatively low amounts of silica and alumina, either as a single skin coating or multiple skin coatings, the durability of the silicate coated pigment is further enhanced by coating the silicate encapsulated $TiO_2$ with sponge alumina in the following manner. Thus, the silicate encapsulated $TiO_2$ while still in the treatment slurry is further treated by lowering the pH to 5.0–5.5 with dilute sulfuric acid while holding the temperature between 70° C.–100<$v$ C. and preferably at 90° C. A water soluble salt of aluminum, i.e., sodium aluminate and/or aluminum sulfate, as the case may be, in the treatment range of 1–2 percent, based on the weight of the $TiO_2$, is added slowly over a 30 minute addition period while the pH is held constant at 5.0–5.5 and the temperature of the slurry at 90° C. After 60 minutes the pH is adjusted to a pH of 7–8 and maintained at this level until all of the soluble aluminum salt is precipitated as spongelike hydrous aluminum oxide on the silicate encapsulated $TiO_2$. Thereafter, the slurry is filtered to recover the pigment product which is washed and then heated to a temperature sufficiently high to partially dehydrate the sponge alumina, a preferred temperature being from about 120° C. to about 350° C. Although a temperature as high as 500° C. may be used. This coating of alumina is relatively fluffy and pervious in composition and is herein referred to as sponge alumina.

When the pigment is given a single skin coating of aluminum silicate the sponge alumina is applied without prior drying and milling of the silicate encapsulated pigment. On the other hand when multiple skin coatings of aluminum silicate are applied to the pigment the sponge alumina is applied preferably following drying and milling of the final skin coating of aluminum silicate.

Moreover when the sponge alumina treatment is applicable to a silicate encapsulated $TiO_2$ wherein the ratio of silica to alumina is relatively high, i.e., 4:1 or higher it has been found that the coating of sponge alumina is especially advantageous when the ratio of silica to alumina is relatively low i.e., about 2:1. At these low ratios, and hence relatively low amounts of silica on a $TiO_2$ weight basis, the durability of the silicate encapsulated $TiO_2$ tends to be relatively low. It has been found however that coating the silicate encapsulated $TiO_2$ with spongelike hydrous aluminum oxide and heating at elevated temperatures sufficient to partially dehydrate the alumina, i.e., temperatures from 120° C.–350° C. the finished pigment will have high tinting strength plus durabilities equal to or better than a silicate encapsulated pigment prepared with higher ratios of silica and alumina — this despite the relatively low amount of silica on a $TiO_2$ weight basis.

The following procedures were used for testing the optical properties and durability of the silicate encapsulated $TiO_2$ pigment of this invention and for comparing it with $TiO_2$ pigments made according to the methods of the prior art.

A thermosetting acrylic paint was prepared by thoroughly mixing a pigment sample with a thermosetting acrylic resin (Rohm and Haas-Uformite MM–47), at 15 PVC with a ratio of acrylic to melamine of 70 to 30. The paint was then sprayed onto an aluminum panel (two coats), air dried for 20 minutes and then baked for 17 minutes at 120° C. The green, red and blue reflectance values of the pain panel were measured on a Colormaster Differential Colorimeter, manufactured by Manufacturers Engineering and Equipment Corp., Hatboro, Pa. The green reflectance values of the pigment samples (expressed in percent) were compared with standard pigments for brightness. The blue minus red reflectance values divided by green reflectance were taken as a measure of the color tone of the pigment samples. The tinting strength of the coating composition was measured by the standard Reynolds Tinting Strength Test as described in Physical and Chemical Examination of Paints, Varnishes, Lacquers and Colors by H. V. Gardner; 9th. Edition — 5/39 — page 37.

The paint panels were tested in an Atlas WeatherOmeter to determine their durability on exposure to atmospheric weather conditions; and were also tested for acid solubility as a measure of density of the aluminum silicate skin coating by digesting 0.5 grams of pigment in 25 ml. of 96% $H_2SO_4$ for 1 hour at 175° C. utilizing an oil bath to control the temperature. It is very important that the temperature be accurately controlled to obtain reproducible results. Acid solubilities of no more than 10 percent and preferably as low as 4 percent or lower are considered to be indicative of a dense skin coating highly resistant to chalking.

The following examples are presented to show further the details of the instant invention

EXAMPLE 1

The $TiO_2$ pigment used as the starting material in this and the following examples was produced as the reaction product of the vapor phase reaction between titanium tetrachloride and an oxygen-containing gas. The $TiO_2$ pigment was slurried and dispersed in water at 20 percent solids and heated to 90° C. The pH of the pigment slurry was adjusted to 9.0 by the addition of NaOH. An N-Brand sodium silicate solution containing 60 g.p.l. $SiO_2$ was then added to the slurry simultaneously with a solution of aluminum sulfate at a rate of 5 percent total treatment per hour. In order to keep the pH constant at 9.0, NaOH was added to the sodium silicate solution. The amount of $SiO_2$ added was 4% on a $TiO_2$ basis and the amount of $Al_2O_3$ added was 1% on a $TiO_2$ basis. After the solutions were added, the pH of the treated slurry was lowered to 7.0 by the addition of $H_2SO_4$. A dense skin coating of hydrated aluminum silicate formed on the surface of the $TiO_2$ and was allowed to age at 90° C. for 1 hour. After ageing, the silicate coated $TiO_2$ was subjected to a second coating 5:1 treating the slurry with NaOH to again raise the pH to 9.0 and adding water soluble silicate and aluminum compounds in the same manner as was done in the first stage. The slurry was then treated with $H_2SO_4$ to lower the pH to 7.0 and the second coating of aluminum silicate allowed to age at 90° C. for 1 hour. After the second ageing process, the silicate encapsulated $TiO_2$ was then filtered, washed and then finished by drying at 120° C. followed by milling in a steam micronizer at a steam to pigment ratio of 5:1.

This hydrated aluminum silicate encapsulated TiO₂ pigment possessed a tinting strength of 1775 and an oil absorption of 26.8. When this sample was made up into a paint and subjected to a WeatherOmeter to measure the durability, its durability after 70 hours was 9 on a scale ranging from 1 to 10 with 1 rated as poor and 10 rated as excellent. This value was comparable to outstanding durability as measured by outdoor exposure tests. Further, acid solubility was 5.0 percent, the brightness of the pigment when incorporated in an acrylic vehicle was 95 (percent green reflectance) and the colortone was 4.

EXAMPLE 2

In this experiment the procedure of Example 1 was repeated except that the pH of the slurry was held at 9.0 during both the precipitation and ageing steps. The results are recorded in the Table along with those of Example 1. Again the finished pigment combined both high tinting strength (1725) with low acid solubility (7.1 percent) i.e., high durability.

EXAMPLES 3–6

The procedure of Example 1 was repeated except that varying amounts of SiO₂ and Al₂O₃ were employed in varying ratios, the total amounts of coding agents employed in Examples 3–5 being within the ranges contemplated by the instant invention. In Example 6 however the total amount of alumina and silica coprecipitated in two stages was only 5 percent and neither high temperature drying nor sponge alumina was used to finish the pigment. It should be noted that while the tinting strength of the silicate encapsulated pigment of Example 6 was comparable to those of the proceeding examples the acid solubility increased to 39.0 percent which is far beyond the upper permissible limit of 10.0 percent.

EXAMPLE 7

This run is presented to show that a good quality pigment is also obtained when a single skin coating consisting of a relatively low total amount of silica and alumina is applied to the TiO₂ pigment followed by a coating of 1.0 percent sponge alumina. Thus a single skin coating of aluminum silicate was applied following the procedure of Example 1, the total amount of coprecipitated silica and alumina employed to form the single skin coating of aluminum silicate being 5 percent. The sponge alumina coating was then applied to the single skin coating of aluminum silicate in the manner described above the amount of alumina as Al₂O₃ being 1.0 percent, after which the pigment was dried and milled. It will be seen fro the Table that the acid solubility was 7.0 percent which is well below the upper permissible limit of 10.0 percent and that the finished pigment had exceptionally high tinting strength.

EXAMPLE 8

The procedure of Example 6 was again repeated i.e., a two stage treatment using a total of only 5 percent coprecipitated alumina and silica. However in this example the silicate encapsulated TiO₂ pigment was dried, milled and then coated with 1.5 percent sponge alumina, using the procedure described above, followed by drying at about 120° C. to form sponge alumina and thereafter steam micronized at a steam to pigment ratio of 5:1. As shown in the Table below the pigment retained all of the desirable optical properties of the pigment of Example 6 and in addition had an acid solubility value within the acceptable range for good durability.

EXAMPLE 9

Another pigment was made using the procedure of Example 1 except that the ratio of silica to alumina was 2:1 with 6 percent total silica and alumina. Following the second stage coating the slurry was filtered and the silicate encapsulated TiO₂ washed and then coated with 1 percent sponge alumina followed by calcination at 350° C. and steam milling at a steam to pigment ratio of 5:1. As shown in the Table the tinting strength of this pigment was excellent and its durability was comparable to that of the silicate encapsulated pigment prepared with higher amounts of silica.

EXAMPLE 10

Additional pigments were made following the two stage treatment technique of Example 1 wherein the ratio of silica to alumina was 4:1 in each stage. However following ageing of the first skin coating the pigment slurry was filtered and the silicate encapsulated TiO₂ pigment was washed, dried at 120° C. and milled in a steam micronizer at a steam to pigment ratio of 5:1. Thereafter the TiO₂ reslurried, the pH of the slurry again adjusted to 9.0 and the second skin coating of aluminum silicate was applied which in turn was aged and thereafter the slurry was filtered followed by washing, drying the encapsulated TiO₂ pigment at 120° C. and then steam micronizing at 5:1.

As shown in the Table the finished pigment had a tinting strength in acrylics of 1735; a brightness of 95.0 and an oil absorption of 19.7 and a durability measured in terms of H₂SO₄ solubility of 2.5. This pigment thus combined excellent tinting strength with excellent durability.

EXAMPLES 11 AND 12

Two additional pigments were made again using multiple skin treatments following the procedure of Example 1 except that the ratio of silica and alumina was only 2:0.25. Thus the total amount of silica and alumina used was only 4 percent and 0.50 percent respectively. As in Example 10 the silicate encapsulated pigment was dried and steam micronized following each skin treatment. Thereafter the pigment was given a sponge coating of 1.5 percent alumina after which it was dried at 120° C. and steam micronized at a steam to pigment ratio of 5:1. The pigment of Example 11 differed from the pigment of Example 12 in that each skin treatment of Example 11 was dried at 120° C. whereas in Example 12 the first skin coating was dried at 300° C. and the second at 120° C.

As shown in the Table each of these silicate encapsulated pigments combined exceptionally high tinting strength with maximum durabilities.

EXAMPLE 13

An additional experiment was run to show the superiority of the aluminum silicate encapsulated TiO₂ of this invention over pigments prepared according to the prior art. The pigment in this example was prepared according to the teaching of U.S. Pat. No. 3,383,231 wherein TiO₂ is coated with a mixture of alumina and silica at relatively low pH as a consequence of which the alumina-silica coating was fluffy and pervious. As shown in the Table below this prior art pigment had good tinting strength but very high (32.8 percent) solubility in H₂SO₄ and hence did not combine the high durability and excellent optical properties that characterize the improved pigment of this invention.

While this invention has been described and illustrated by the examples shown, it is not intended to be strictly limited thereto, and other variations and modifications may be employed within the scope of the following claims.

TABLE

| Treatment | Example no. | | | |
|---|---|---|---|---|
| | 1 | 2 | 3 | 4 |
| First silicate coating | | | | |
| Slurry pH | 9 | 9 | 9 | 9 |
| % SiO₂ | 4 | 4 | 6 | 8 |
| % Al₂O₃ | 1 | 1 | 2 | 3 |
| Drying (°C.) | — | — | — | — |
| Milling (s/p) | — | — | — | — |
| Second silicate coating | | | | |
| Slurry pH | 9 | 9 | 9 | 9 |
| % SiO₂ | 4 | 4 | 6 | 6 |
| % Al₂O₃ | 1 | 1 | 2 | 3 |
| Drying (°C.) | 120 | 120 | 120 | 120 |
| Milling (s/p) | 5:1 | 5:1 | 5:1 | 5:1 |
| Sponge Al₂O₃ coating (%) | 0 | 0 | 0 | 0 |
| Drying (°C.) | — | — | — | — |
| Milling(s/p) | — | — | — | — |
| Properties | | | | |
| Tinting Strength (Reynolds) | 1775 | 1725 | 1625 | 1625 |
| Durability(70-hrs.) | | | | |

| | 1 | 2 | 3 | 4 | |
|---|---|---|---|---|---|
| (Weather-Ometer) | 9 | 9 | — | — | |
| $H_2SO_4$ solubility($) | 5.0 | 7.1 | 4.2 | 3.2 | |
| Brightness (% green reflectance) | 95.2 | 94.6 | 94.4 | 94.4 | |
| Color Tone %XB-%R/%G | +4.0 | +4.7 | +4.7 | +4.9 | |
| Oil Absorption | 26.8 | 28.3 | 28.7 | 21.8 | |
| | 5 | 6 | 7 | 8 | |
| First Coating | | | | | |
| Slurry pH | 9 | 9 | — | 9 | |
| % $SiO_2$ | 3 | 2 | 4 | 2 | |
| % $Al_2O_3$ | 1 | 0.5 | 1 | 0.5 | |
| Drying (°C.) | — | — | — | — | |
| Milling(s/p) | — | — | — | — | |
| Second Coating | | | | | |
| Slurry pH | 9 | 9 | — | 9 | |
| % $SiO_2$ | 3 | 2 | 0 | 2 | |
| % $Al_2O_3$ | 1 | 0.5 | 0 | 0.5 | |
| Drying (°C.) | 120 | 120 | — | 120 | |
| Milling(s/p) | 5:1 | 5:1 | — | 5:1 | |
| Sponge $Al_2O_3$ Coating(%) | 0 | 0 | 1.0 | 1.5 | |
| Drying(°C.) | — | — | 120 | 120 | |
| Milling(s/p) | — | — | 5:1 | 5:1 | |
| Properties | | | | | |
| Tinting Strength | 1725 | 1725 | 1850 | 1825 | |
| $H_2SO_4$ Solubility (%) | 9.0 | 39.0 | 7.0 | 10.0 | |
| Brightness (% green reflectance) | 94.3 | 95.6 | 93.9 | 95.1 | |
| Color Tone (%XB-%R)/%G | +5.0 | +5.0 | +5.2 | +5.1 | |
| Oil Absorption | 24.0 | 21.3 | 18.5 | 23.5 | |
| | 9 | 10 | 11 | 12 | 13 |
| First Coating | | | | | |
| Slurry pH | 9 | 9 | 9 | 9 | 3-8 |
| % $SiO_2$ | 2 | 4 | 2 | 2 | 4 |
| % $Al_2O_3$ | 1 | 1 | 0.25 | 0.25 | 1 |
| Drying (°C.) | — | 120 | 120 | 300 | — |
| Milling(s/p) | — | 5:1 | 5:1 | 5:1 | — |
| Second Coating | | | | | |
| Slurry pH | 9 | 9 | 9 | 9 | 3-8 |
| % $SiO_2$ | 2 | 4 | 2 | 2 | 4 |
| % $Al_2O_3$ | 1 | 1 | 0.25 | 0.25 | 1 |
| Drying(°C.) | — | 120 | 120 | 120 | — |
| Milling(s/p) | — | 5:1 | 5:1 | 5:1 | — |
| Sponge $Al_2O_3$ coating(%) | 1.0 | — | 1.5 | 1.5 | 0 |
| Drying (°C.) | 350 | — | 120 | 120 | — |
| Milling(s/p) | 5:1 | — | 5:1 | 5:1 | — |
| Properties | | | | | |
| Tinting Strength | 1875 | 1735 | 1875 | 1900 | 1825 |
| $H_2SO_4$ Solubility(%) | 3.1 | 2.5 | 4.7 | 2.5 | 32.8 |
| Brightness (% green reflectance) | 95.1 | 95.0 | 94.2 | 94.7 | 94.9 |
| Color Tone %XB-%R/XG | +5.1 | 4.8 | 5.7 | 5.9 | +3.9 |
| Oil Absorption | 24.0 | 19.9 | 20.3 | 20.3 | 38.3 |

I claim:

1. A silicate encapsulated $TiO_2$ consisting of pigmentary $TiO_2$ having an impervious, dense skin of hydrated aluminum silicate in an amount from 5.0 percent to 20.0 percent on a $TiO_2$ weight basis, and optionally a coating on said aluminum silicate skin of from 1.0 to 2.0 percent sponge alumina calculated on a $TiO_2$ weight basis.

2. A silicate encapsulated $TiO_2$ pigment according to claim 1 wherein the amount of sponge alumina on said silicate encapsulated $TiO_2$ is about 1.5 percent calculated on a $TiO_2$ weight basis.

3. A silicate encapsulated $TiO_2$ pigment according to claim 1 wherein the silicate encapsulated $TiO_2$ pigment has been dried and milled.

4. A silicate encapsulated $TiO_2$ pigment according to claim 3 wherein the amount of hydrated aluminum silicate on said $TiO_2$ pigment is from 5-10 percent and the amount of sponge alumina on said silicate encapsulated $TiO_2$ is about 1.0 percent calculated on a $TiO_2$ weight basis.

5. A method for producing a silicate encapsulated $TiO_2$ pigment characterized by a dense impervious skin of hydrated aluminum silicate and having exceptionally good color and durability when incorporated in acrylic coating compositions which comprises forming an aqueous slurry of pigmentary $TiO_2$, adjusting the pH of the slurry to fall within the range of from 8.5 to 10.5 and coprecipitating $SiO_2$ and $Al_2O_3$ onto the pigmentary $TiO_2$ in two successive stages to form successive coatings of hydrated aluminum silicate on said pigmentary $TiO_2$ the first stage coprecipitation of $SiO_2$ and $Al_2O_3$ being effected by heating the slurry to a temperature of at least 70° C. to boiling, simultaneously adding solutions of soluble slats of silicon and aluminum to said slurry at a rate not to exceed 10 percent total silicate coating per hour on a $TiO_2$ weight basis and maintaining the pH of said slurry in the range 8.5 to 10.5 and the temperature of said slurry at least 70° C. to boiling during the addition of said solutions, thereafter adjusting the pH of the slurry in the range of from 7.0 to 10.5 and maintaining the slurry at a temperature of at least 70° C. to boiling for at least 45 to 90 minutes to age the hydrated aluminum silicate coating on said pigmentary $TiO_2$, the second stage coprecipitation of $SiO_2$ and $Al_2O_3$ being effected by readjusting the pH of the said slurry in the range of from 8.5 to 10.5 and again simultaneously adding solutions of soluble salts of silicon and aluminum to said slurry in the same manner as that described for the first stage coprecipitation, thereafter readjusting the pH of the slurry at a temperature of at least 70° C. to boiling for at least 45 to 90 minutes to age the second coating of hydrated aluminum silicate, the amount of soluble salts of silicon and aluminum added to said slurry being such that the total amount of hydrated aluminum silicate deposited on said pigmentary $TiO_2$ is from 5 percent to 20 percent based on weight of said $TiO_2$ whereby said pigmentary $TiO_2$ is completely encapsulated by said hydrated aluminum silicate, said soluble salts being added in proportions to provide a ratio of $SiO_2:Al_2O_3$ in the range from 2:1 to 8:1, and thereafter finishing the silicate encapsulated $TiO_2$ by drying at from 120° C. to 350° C. followed by milling.

6. A method for producing a silicate encapsulated $TiO_2$ pigment according to claim 5 wherein the temperature of the $TiO_2$ slurry is maintained at 90° C. during both said first and second stage coprecipitations of the alumina and silica and each coating of hydrated aluminum silicate is aged for 45 minutes.

7. A method for producing a silicate encapsulated $TiO_2$ pigment according to claim 5 wherein the total amount of silica and alumina used in forming said skin of hydrated aluminum silicate is 10 percent on a $TiO_2$ weight basis and the silicate coated $TiO_2$ is dried by heating to a temperature of 120° C., and steam micronized at a steam to pigment ratio of 5:1.

8. A method for producing a silicate encapsulated $TiO_2$ pigment according to claim 5 wherein the total amount of silica and alumina used in forming said skin of hydrated aluminum silicate is 5 percent on a $TiO_2$ weight basis and the silicate encapsulated $TiO_2$ is finished by drying at a temperature from 120-350° C., steam micronizing at a steam to pigment ratio of from 3:1 to 5:1, and thereafter coated with from 1.0 to 2.0 percent hydrous aluminum oxide on a $TiO_2$ weight basis, followed by drying and steam micronizing.

9. A method for producing a silicate encapsulated $TiO_2$ pigment according to claim 5 wherein the ratio of silica and alumina used in coprecipitating the hydrated aluminum silicate on said pigmentary $TiO_2$ is 8:1 the total amount of silica and alumina comprises about 4.5 percent on a $TiO_2$ weight basis, and the silicate encapsulated pigment is finished by drying at a temperature of 120° C., steam micronizing at a steam to pigment ratio of 5:1 and thereafter coated with 1.5 percent hydrous aluminum oxide on a $TiO_2$ weight basis followed by drying at 120° C. and steam micronizing at a steam to pigment ratio of 5:1.

10. A method for producing a silicate encapsulated $TiO_2$ pigment according to claim 5 wherein the ratio of $SiO_2$ to $Al_2O_3$ is 4:1 and the application of each successive skin coating is followed by drying and milling.

11. A method for producing a silicate encapsulated $TiO_2$ pigment according to claim 10 wherein each successive skin coating is finished by drying at a temperature within the range from 120°-350° C. and milling at a steam to pigment ratio of from 3:1 to 5:1.

12. A method for producing a silicate encapsulated $TiO_2$ pigment according to claim 11 wherein the ratio of $SiO_2$ to $Al_2O_3$ is 8:1 and a coating from 1.0–2.0 percent hydrous aluminum oxide is applied to the silicate encapsulated pigment following drying and milling of the final skin coating after which the alumina coated silicate encapsulated pigment is dried and milled.

13. A method for producing a silicate encapsulated $TiO_2$ pigment characterized by a dense impervious skin of hydrated aluminum silicate and having exceptionally good color and durability when incorporated in acrylic coating compositions which comprises forming an aqueous slurry of pigmentary $TiO_2$, adjusting the pH of the slurry to fall within the range of from 8.5 to 10.5 and coprecipitating $SiO_2$ and $Al_2O_3$ onto the pigmentary $TiO_2$ to form a coating of hydrated aluminum silicate on said pigmentary $TiO_2$ the coprecipitated of $SiO_2$ and $Al_2O_3$ being effected by heating the slurry to a temperature of at least 70° C. to boiling, simultaneously adding solutions of soluble salts of silicon and aluminum to said slurry at a rate not to exceed 10 percent total silicate coating per hour on a $TiO_2$ weight basis and maintaining the pH of said slurry in the range 8.5 to 10.5 and the temperature of said slurry at least 70° C. to boiling during the addition of said solutions, thereafter adjusting the pH of the slurry in the range from 7.0 to 10.5 and maintaining the slurry at a temperature of at least 70° C. to boiling for at least 45 to 90 minutes to age the hydrated aluminum silicate coating on said pigmentary $TiO_2$, the amount of soluble salts of silicon and aluminum added to said slurry being such that the total amount of hydrated aluminum silicate deposited on said pigmentary $TiO_2$ is from 5 percent to 20 percent based on weight of said $TiO_2$ whereby said pigmentary $TiO_2$ is completely encapsulated by said hydrated aluminum silicate, said soluble salts being added in proportions to provide a ratio of $SiO_2:Al_2O_3$ in the range from 2:1 to 8:1, and thereafter finishing the silicate encapsulated $TiO_2$ by coating with from 1.0 to 2.0 percent hydrous aluminum oxide followed by drying and milling.

* * * * *